Aug. 26, 1930. J. F. CUSHING 1,774,320
FLEXIBLE METALLIC JOINT
Filed March 23, 1928 2 Sheets-Sheet 1
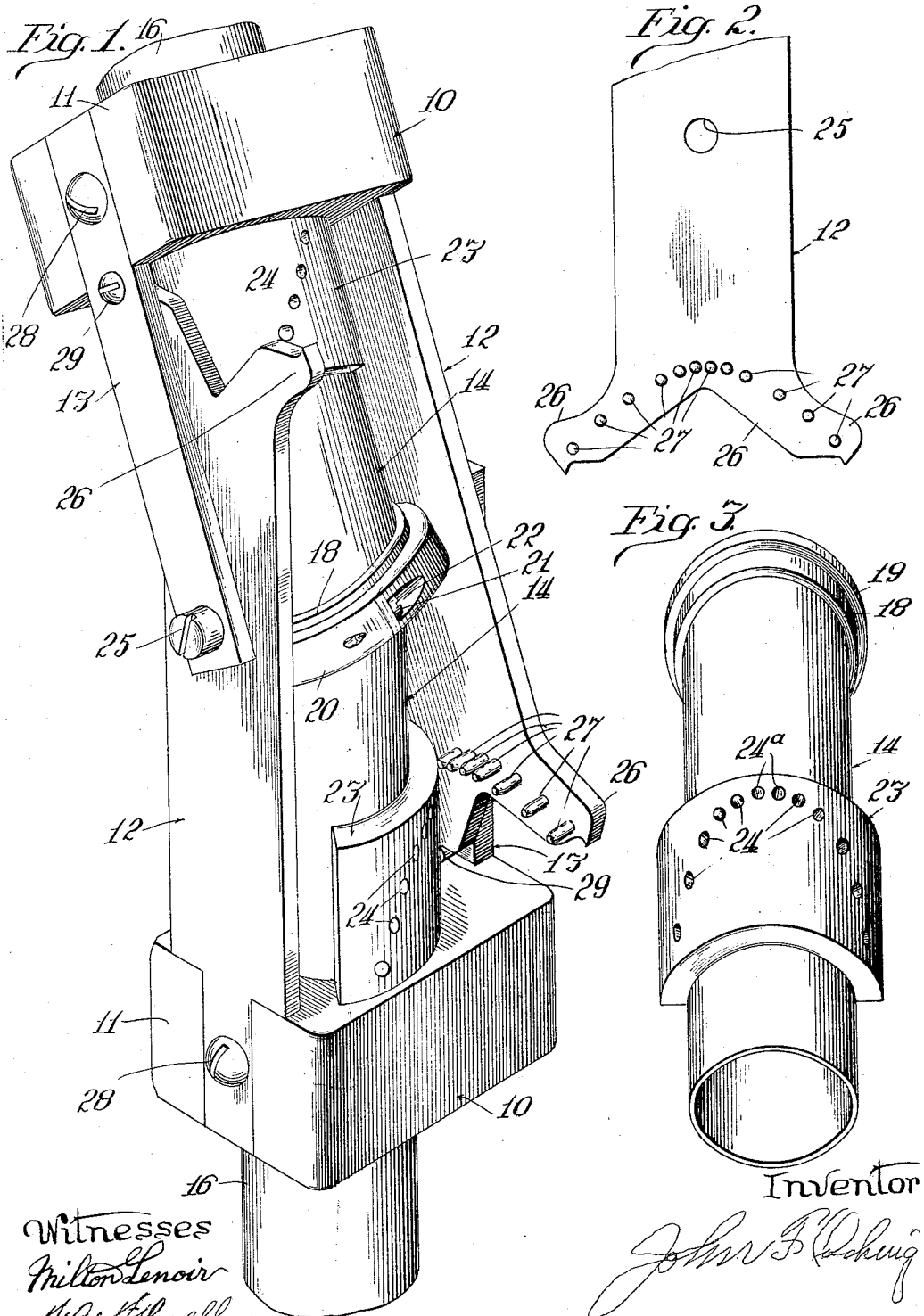

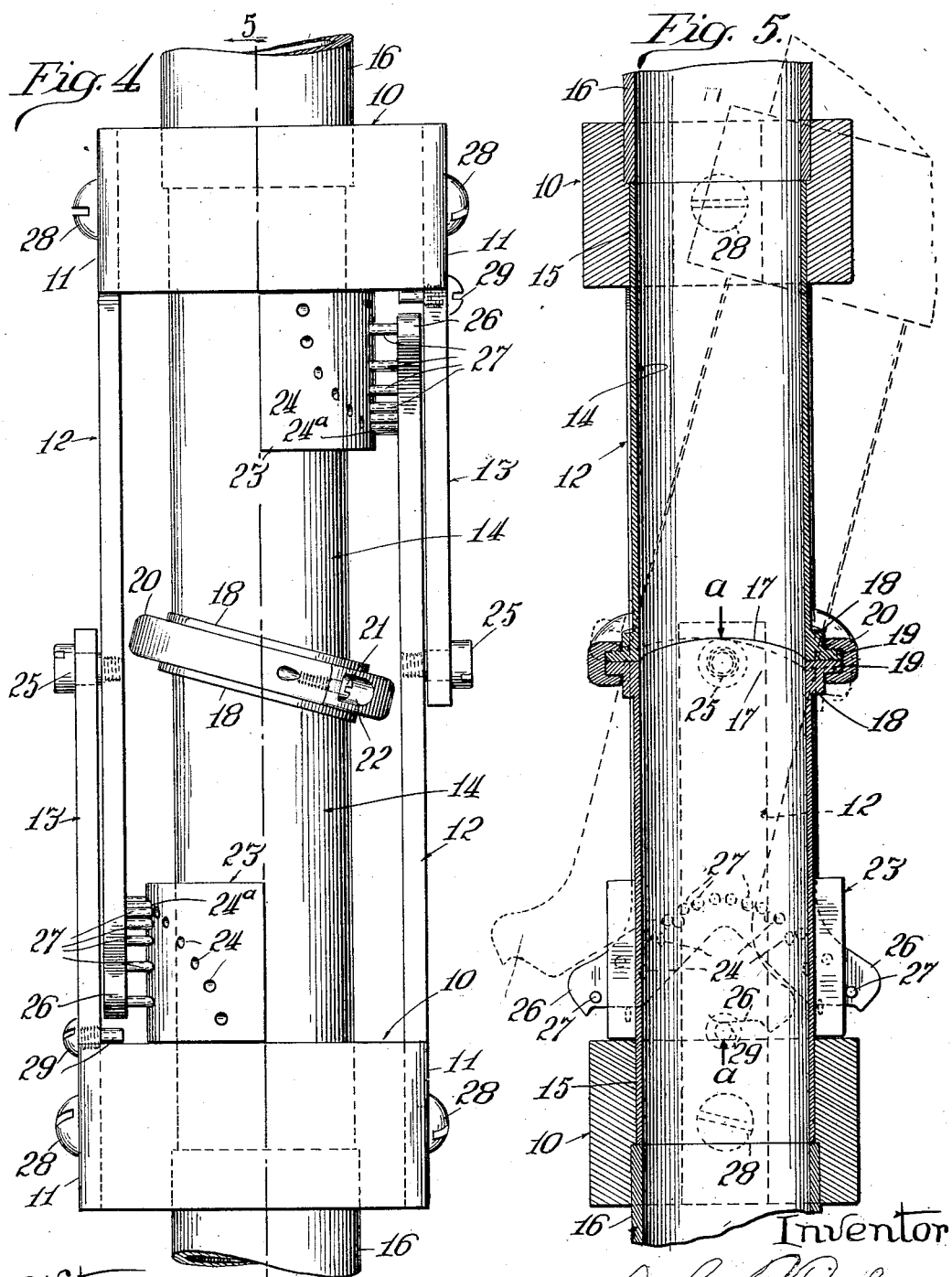

Patented Aug. 26, 1930

1,774,320

UNITED STATES PATENT OFFICE

JOHN F. CUSHING, OF CHICAGO, ILLINOIS

FLEXIBLE METALLIC JOINT

Application filed March 23, 1923. Serial No. 264,164.

My invention relates to flexible joints especially intended for use in pipes or tubes for conveying gases, fluids and the like; the joint being preferably intended for use in place of the ordinary ball and socket type of joint.

My invention has for its object the provision of a structure whereby less resistance to the passage of the liquid or gas through the joint will be offered and the eddies and cross-sectional changes at the center of rotation encountered in the ordinary ball joint materially lessened.

A further object of my invention is to provide a flexible joint possessing a much greater range of oscillation or swing to either side of the longitudinal axis of the pipe or conduit and such movement of the joint accomplished with less friction or resistance to the flow of the material through the conduit or pipe.

The above enumerated objects and advantages, as well as other advantages inherent in the construction, will all be more fully comprehended from the following detailed description of the accompanying drawings, wherein—

Figure 1 is a perspective view of my improved joint shown applied to portions of pipe sections which are disposed at an angle to each other.

Figure 2 is a detail view, in elevation, of one end of a combined connecting and cylindrical element rotating arm.

Figure 3 is a perspective view of one of the cylindrical elements or tubes of the joint.

Figure 4 is an elevation of my improved joint as applied to the ends of two conduits or pipes, illustrating the position of joint forming elements when the connected pipes are substantially in alignment with each other.

Figure 5 is a longitudinal sectional view taken on the line 5—5 of Figure 4; a positioning of the joint forming elements when the connected pipes are positioned at an angle to each other being shown in dotted lines.

In the particular exemplification of the invention, 10, 10 designates two pipe and receiving members or blocks of any desired configuration, being preferably rectangular as shown so as to present plain or flat sides 11, for easy attachment of the connecting and controlling bars or arms 12, 13 thereto.

The members 10, 10 are each socketed to receive a cylindrical member or tube section 14, which is made to fit snugly in its respective socketed member 10 so as to provide a fluid tight joint as clearly shown in Figure 5 at 15. The members 10 are of such vertical dimensions that they may also receive the adjacent ends of the main conduits or pipes 16, 16; the bores of members 10, 10 on what may be termed the outer ends, being such as to permit a firm or wedging fit between the pipes 16 and the members 10 to be obtained. As shown in Figure 5, the ends of the main pipes or conduits 16 are preferably driven into members 10 so as to abut against the inserted ends of the cylindrical members 14, whose internal diameters are preferably made to equal the internal diameters of the main pipe sections which are to be flexibly connected and thus provide a continuous uniform channel for the material flowing therethrough.

The abutting ends of the two cylindrical members or tube sections 14, 14 are cut at a predetermined angle to form a swing joint whose limit of motion will always be greater than the angle of cut of the abutting ends of members 14, 14.

The adjacent ends 17 of the two cylindrical members 14, 14, for example, are cut at approximately a fifteen degree angle, as shown in Figure 5, and arranged in matching relation with each other. These ends are each externally provided with a flange or flanged ring 18, formed integral with the members 14, or welded thereto and arranged at the same inclination as the angle of cut of members 14, 14, with the laterally disposed flanges of said flanged rings 18 flush with the immediate ends of the cylindrical members 14, 14, thus causing the lateral flanges 19, 19, of the flanged rings 18, 18, to be in face to face relation with each other.

These flanged rings 18, 18 are then provided with the internally grooved sectional collar 20, whose circumferential groove is of dimensions just sufficient to receive the abutting lateral flanges 19, 19 of the rings 18 so as to maintain a fluid tight fit. In order to permit assembly, the collar 20 has been shown formed of two segments and of sufficient thickness to permit the main or body portion of the segments at their ends to be provided with tapped holes arranged tangentially to receive the holding screws 21 at each end of the segments. The segment which receives the head end of the screws is shown provided with a tangential groove or slot 22 leading to the tapped opening so that proper insertion of the screws is possible and in order that the heads of the screws may lie within the plane of the perimeter of the clamping collar or ring 20. It is apparent that the collar 20 will maintain proper abutting relation between the oppositely beveled ends of the cylindrical members or tubes 14, 14, while at the same time permitting a rotative movement between said cylindrical members.

Each cylindrical member 14, adjacent to the outer end, namely adjacent to its respective connecting block 10, is shown provided with a segmental enlargement or block 23 adapted to extend substantially half way round the cylindrical members. These segmental blocks or portions 23 are rigidly secured to or formed integral with the cylindrical members 14, 14, and are arranged so that the vertical center of each portion 23 will be in vertical alignment with the apex or uppermost point of the angularly cut or beveled end of the cylindrical member as is apparent from Figures 4 and 5 and as indicated by the arrows a, a.

With the enlarged portions 23 arranged on their respective cylindrical members 14 as just mentioned, it is apparent that said portions will be disposed on opposite sides of the vertical axis through the device, see Figure 4; and the vertical centers of the two enlarged portions or blocks 23 will therefore be 180° apart relative to the axis of the circle defined by said portions.

Each portion 23 is shown provided with a predetermined number of holes 24 arranged in a cone-shape arc or substantially parabolic curve, more clearly shown in Figure 3, the holes being located prearranged distances apart, with the distances between the holes increasing from the two uppermost holes 24ª, which latter are placed an equal distance removed on opposite sides of the longitudinal center line of the cylindrical member, see Figure 3. That is to say, the distance between the holes 24 increases toward the ends of the curve, with the lowermost or end holes arranged in a vertical plane approximately ninety degrees removed from the vertical plane between the two uppermost holes 24ª.

Each block, or pipe receiving member 10, is provided with a connecting bar on controlling arm 12 and a bar 13; and the enlarged portions 23, when the cylindrical members 14, 14 are in direct alignment with each other, are disposed toward the free ends of the respective arms 12, see Figure 4.

The arm 13 of one block or pipe receiving member 10 is pivotally connected to the arm 12 of the other block or pipe receiving member 10; with the pivotal points 25 of the arms on opposite sides disposed in a plane midway of the bevel or angle of the ends of the cylindrical members 14, 14. As shown in Figure 4, the various elements are so arranged that the cylindrical fluid conducting members 14, 14 may be oscillated about the axis of the pivot points 25; the pivot points 25 being arranged midway between the pipe receiving blocks or members 10, 10.

The two arms 12, 12, which are arranged at diametrically opposite points relative to the members 14, 14, and normally parallel with the axes of said members 14, 14, are each extended beyond their pivot points 25; with their free ends flared or preferably bifurcated as shown at 26 in Figure 2.

The flared free ends 26 of the arms 12, 12 are each provided with a toothed gear having a variable radii, which mesh and engage with the gear or set of holes 24 of varying distances as previously stated.

In the particular exemplification of the invention the gearing is preferably shown in the nature of the holes 24 and teeth or pins 27; but it is apparent that other suitable interengaging surfaces may be arranged on the free ends 26 of the arms 12 and the adjacent sides of the respective fluid conducting tubes or members 14, 14.

Although the two cylindrical members 14, 14 are intended to have a snug and fluid tight connection with the socketed blocks 10, the members 14 are also intended to rotate in said blocks 10; the relations between the abutting ends of members 14, 14 and with their respective blocks 10 being maintained by the two sets of pivotally connected arms 12, 13.

As is apparent from the construction described, where the pipes or conduits 16, 16 are to be disposed at an angle to each other movement of either pipe receiving member 10 out of alignment with the other member 10 will cause a predetermined rotation of the cylindrical members 14, 14 at equal though variable speeds in opposite directions, thereby maintaining the angularity cut ends of the two cylindrical members 14, 14 in abutting matching relation; the extent and speed of rotation being correlated to the degree of angle at which the abutting ends of the cylindrical members 14, 14 are cut.

The invention provides a swinging or flexible metallic joint wherein the fluid conducting portions of the joint are given rotary movement in keeping with the degree of angle existing at the abutting ends of the two portions; with the limit of motion of the joint substantially double the said angle of cut of the abutting ends. For example, if the abutting ends of the fluid conducting portions or members 14, 14 are cut at an angle of fifteen degrees, the limit of motion of the joint to each side of the longitudinal axis will approximate thirty degrees or a total of approximately sixty degrees of motion or swing from one side to the other; the interengaging relation between the free ends of arms 12 and the cylindrical members 14 being such that the members 14 will revolve at a variable speed while the joint is swung at a uniform speed to its angle of deflection. The abutting ends of the members 14 will be maintained in proper relation by the collar 20, which permits opposite rotary movement of members 14.

The arms 12, in the specific construction, are shown provided with reduced ends arranged in slots in the sides of the connector blocks 10 and secured in place by screws 28; while the arms 13, which are likewise secured in place by screws 28, are also each provided with a guide screw 29 adapted to abut against what may be termed the inner face of the block 10 (see Figure 4) thus ensuring the proper positioning and relation of these arms with the blocks.

My invention is especially adapted for use in hydraulic dredges or other similar equipment and offers less resistance to the passage of the material through the joint than is the case with the ball type of joint wherein the eddies and changes in cross section at the center of rotation are greater than with my new flexible joint. Furthermore, a much greater range of swing to each side of the center line of the pipe or conduit may be accomplished and with less friction or resistance to the flow of the material therethrough.

The construction illustrated and described is believed to be a simple embodiment of my invention, but modifications in certain details of construction are possible and may be made without, however, departing from the spirit of my invention.

What I claim is:

1. A flexible metallic joint comprising a pair of cylindrical members arranged in end to end relation, with the abutting ends cut at oblique angles to the axes of said members and matching each other, means for maintaining the cylindrical members in abutting relation, and means, disposed on opposite sides of the members, provided with pivotal points aligned with the abutting ends of said members and having operative connection with both members for imparting rotary movement to said members but in opposite directions when said means is flexed about said pivotal points.

2. A flexible metallic joint comprising a pair of cylindrical members arranged in end to end relation, the abutting ends being cut at a predetermined oblique angle to the axes of the members and arranged in matching relation, means for maintaining the abutting relation between said members and permit rotary movement of the members, and means for supporting said cylindrical members disposed lengthwise thereof and secured thereto, said means having a yielding point in alignment with the abutting ends of the members and having operative relation with the members whereby movement of the means about said yielding point will impart opposite rotary movement to said members as the members are deflected out of axial alignment with each other.

3. A flexible metallic joint comprising a pair of cylindrical members arranged in end to end abutting relation, said abutting ends of both members being cut at corresponding oblique angles and arranged in matching relation, means whereby said abutting ends are maintained in place and rotary movement permitted, and supporting frame members disposed about and lengthwise of the cylindrical members, said frame members being secured to the outer ends of the cylindrical members and provided with pivoted joints adjacent to the abutting ends of the members, and means intermediate of said frame members and each of said cylindrical members whereby the latter are rotated in opposite directions as the frame members and cylindrical members are moved out of axial alignment.

4. A flexible metallic joint comprising a pair of cylindrical members arranged end to end with the abutting ends cut at corresponding oblique angles and arranged in matching relation, means for maintaining said abutting ends in place, a socketed member at the outer end of each cylindrical member, a pair of arms secured to each of said socketed members and arranged parallel with and on opposite sides of said cylindrical members, the arms of both socketed members being pivotally connected together adjacent to the abutting ends of the cylindrical members, and a variable speed toothed gear connection between one arm of each pair and the cylindrical members whereby the latter are rotated at variable speeds in opposite directions as said arms are moved out of axial alignment.

5. A flexible metallic joint comprising a pair of cylindrical members in end to end relation with the abutting ends cut at corresponding matching oblique angles, an encircling collar for maintaining said ends in position, supporting frame members disposed about and lengthwise of the cylindrical members with their outer ends connected to the outer ends of the cylindrical members, said frame members having a swinging joint on opposite sides of the cylindrical members in the plane of the abutting ends of said members, and a variable speed gear connection between the swinging ends of said frame members and each of the cylindrical members whereby the latter are rotated at a speed correlated to the angle of their matching ends as the ends of said frame members are moved out of axial alignment.

6. A flexible metallic joint comprising a pair of cylindrical conduits arranged end to end, with their abutting ends cut at corresponding matching oblique angles, encircling means for holding said ends in place, an apertured connection forming member secured to the outer end of each conduit, a pair of arms connected to each of said connection members and arranged parallel with opposite sides of the conduits, the arms of one connection member being pivotally connected with those of the other, with the pivotal points disposed in the plane of the abutting ends of the conduits, one arm of each pair being extended beyond the pivotal point, and a variable speed toothed gear connection between the extended arms and the conduits whereby the latter are rotated at a speed correlated to the angle of their matching ends while said conduits are moved out of axial alignment.

7. A flexible metallic joint comprising a pair of cylindrical members arranged end to end with their abutting ends cut at corresponding matching oblique angles, means for sealing the joint between said ends and to permit rotary movement, a supporting frame disposed about the members and involving a pair of oppositely disposed arms on opposite sides of the cylindrical members, the arms on each side having a pivotal joint in the transverse plane of the matching ends of the cylindrical members, and variable speed means between the cylindrical members and the free end of one arm of each pair of said arms of the frame whereby the cylindrical members are rotated at a speed correlated to the angle of the matching ends, the ends of the frame having openings disposed therethrough in alignment with the cylindrical members adapted to receive the ends of the conduit.

8. A flexible metallic joint comprising, in combination with a pair of aligned conduits, a pair of tubular members arranged in end to end relation, the abutting ends being cut at a predetermined and corresponding oblique angle, each member being provided with a series of holes arranged in arcuate formation, with the uppermost point of the arc arranged substantially in vertical alignment with the uppermost point of the angular cut of each member, means whereby said abutting ends are maintained in place and rotary movement of the members permitted, and a supporting frame for said members involving connecting blocks apertured to receive the ends of the members and the ends of the conduits and a pair of arms on opposite sides of the members, the arms of each pair being pivotally connected at points in alignment with the abutting ends of the members, the free end of one arm of each pair being provided with arcuately arranged teeth adapted to engage with the series of holes in said members, whereby movement of the arms about their pivot points will cause said tubular members to rotate about their longitudinal axes but in opposite directions.

9. A flexible metallic joint comprising a pair of tubular members arranged in end to end relation with their abutting ends cut at corresponding oblique angles, means whereby said members are maintained in abutting relation and rotative movement permitted, and a supporting and conduit receiving frame involving arms arranged in pairs on opposite sides of the members, the arms of each pair being pivotally connected at points in alignment with the abutting ends of the tubular members, while one arm of each pair has rack and tooth connection with one of said tubular members, whereby movement of the arms about their pivotal points will induce rotative movement of the tubular members in opposite directions.

10. A flexible metallic joint comprising a pair of tubular members arranged in end to end relation with their abutting ends cut at corresponding oblique angles, means whereby said members are removably held in abutting relation and rotative movement permitted, a supporting and conduit receiving frame involving apertured connecting blocks adapted to receive the ends of the members and the ends of conduits and arms arranged in pairs on opposite sides, one end of each arm being connected to one of said blocks, the arms of both pairs being pivotally connected together at points in alignment with the abutting ends of said tubular members, and a rack and tooth connection between the end of one arm of each pair and the tubular members, said rack and tooth connections being arranged in arcuate manner at opposite sides of the joint whereby movement of the arms about their pivotal points will cause said tubular members to rotate about their longitudinal axes in opposite directions.

JOHN F. CUSHING.